(12) United States Patent
Zhang et al.

(10) Patent No.: US 8,681,444 B2
(45) Date of Patent: Mar. 25, 2014

(54) MULTI-ZONE SERVO PROCESSOR

(75) Inventors: Xun Zhang, Westford, MA (US);
Haitao Xia, San Jose, CA (US); Dahua Qin, Allentown, PA (US)

(73) Assignee: LSI Corporation, Milpitas, CA (US)

( * ) Notice: Subject to any disclaimer, the term of this patent is extended or adjusted under 35 U.S.C. 154(b) by 91 days.

(21) Appl. No.: 13/491,135

(22) Filed: Jun. 7, 2012

(65) Prior Publication Data
US 2013/0329312 A1    Dec. 12, 2013

(51) Int. Cl.
*G11B 5/09* (2006.01)
*G11B 5/596* (2006.01)

(52) U.S. Cl.
USPC .................. 360/49; 360/51; 360/77.08

(58) Field of Classification Search
None
See application file for complete search history.

(56) References Cited

U.S. PATENT DOCUMENTS

| | | |
|---|---|---|
| 4,777,544 A | 10/1988 | Brown et al. |
| 5,130,866 A | 7/1992 | Klaassen et al. |
| 5,237,325 A | 8/1993 | Klein et al. |
| 5,278,703 A | 1/1994 | Rub et al. |
| 5,309,357 A | 5/1994 | Stark et al. |
| 5,341,249 A | 8/1994 | Abbott et al. |
| 5,377,058 A | 12/1994 | Good et al. |
| 5,521,948 A | 5/1996 | Takeuchi |
| 5,523,902 A | 6/1996 | Pederson |
| 5,594,341 A | 1/1997 | Majidi-Ahy |
| 5,668,679 A | 9/1997 | Swearingen et al. |
| 5,696,639 A | 12/1997 | Spurbeck et al. |
| 5,768,044 A | 6/1998 | Hetzler |
| 5,781,129 A | 7/1998 | Schwartz et al. |
| 5,798,885 A | 8/1998 | Saiki et al. |
| 5,835,295 A | 11/1998 | Behrens |
| 5,844,920 A | 12/1998 | Zook et al. |
| 5,852,524 A | 12/1998 | Glover et al. |
| 5,892,632 A | 4/1999 | Behrens |
| 5,955,783 A | 9/1999 | Ben-Efraim |
| 5,970,104 A | 10/1999 | Zhong et al. |
| 5,986,830 A | 11/1999 | Hein |
| 5,987,562 A | 11/1999 | Glover |
| 6,009,549 A | 12/1999 | Bliss et al. |
| 6,023,383 A | 2/2000 | Glover et al. |

(Continued)

FOREIGN PATENT DOCUMENTS

| | | |
|---|---|---|
| FR | 2904168 A1 | 1/2008 |
| WO | WO 03/047091 | 6/2003 |
| WO | WO 2008/009620 | 1/2008 |

OTHER PUBLICATIONS

Annampedu, V. et al "Adaptive Algorithms for Asynchronous Detection of Coded Servo Signals Based on Interpolation", IEEE Transactions on Magnetics, vol. 41, No. 10, Oct. 2005.

(Continued)

*Primary Examiner* — Regina N Holder
(74) *Attorney, Agent, or Firm* — Hamilton DeSanctis & Cha

(57) ABSTRACT

The present inventions are related to systems and methods for transferring information to and from a storage medium, and more particularly to systems and methods for positioning a sensor in relation to a storage medium. For example, an apparatus for determining a sensor position is disclosed that includes a data stream processor operable to generate a number of data streams at different frequencies based on an input data stream, a number of servo preamble detectors each operable to process a different one of the data streams to detect a servo preamble, a selector operable to output one of the data streams in which the servo preamble was detected as a winning data stream, and a pattern detector operable to detect a pattern in the winning data stream.

20 Claims, 5 Drawing Sheets

(56) References Cited

U.S. PATENT DOCUMENTS

| | | |
|---|---|---|
| 6,069,583 A | 5/2000 | Silvestrin et al. |
| 6,081,397 A | 6/2000 | Belser |
| 6,111,712 A | 8/2000 | Vishakhadatta et al. |
| 6,208,478 B1 | 3/2001 | Chiu et al. |
| 6,269,058 B1 | 7/2001 | Yamanoi et al. |
| 6,278,591 B1 | 8/2001 | Chang |
| 6,400,518 B1 | 6/2002 | Bhaumik et al. |
| 6,404,829 B1 | 6/2002 | Sonu |
| 6,411,452 B1 | 6/2002 | Cloke |
| 6,441,661 B1 | 8/2002 | Aoki et al. |
| 6,476,989 B1 | 11/2002 | Chainer |
| 6,490,110 B2 | 12/2002 | Reed et al. |
| 6,493,162 B1 | 12/2002 | Fredrickson |
| 6,519,102 B1 | 2/2003 | Smith et al. |
| 6,530,060 B1 | 3/2003 | Vis et al. |
| 6,603,622 B1 | 8/2003 | Christiansen et al. |
| 6,606,048 B1 | 8/2003 | Sutardja |
| 6,633,447 B2 | 10/2003 | Franck et al. |
| 6,646,822 B1 | 11/2003 | Tuttle et al. |
| 6,657,802 B1 | 12/2003 | Ashley et al. |
| 6,671,404 B1 | 12/2003 | Kawatani |
| 6,717,764 B2 | 4/2004 | Lake |
| 6,775,529 B1 | 8/2004 | Roo |
| 6,788,484 B2 | 9/2004 | Honma |
| 6,813,108 B2 | 11/2004 | Annampedu et al. |
| 6,816,328 B2 | 11/2004 | Rae |
| 6,839,014 B2 | 1/2005 | Uda |
| 6,856,183 B2 | 2/2005 | Annampedu |
| 6,865,040 B2 | 3/2005 | Fayeulle et al. |
| 6,876,511 B2 | 4/2005 | Koyanagi |
| 6,906,990 B2 | 6/2005 | Nagata et al. |
| 6,912,099 B2 | 6/2005 | Annampedu et al. |
| 6,963,521 B2 | 11/2005 | Hayashi |
| 6,980,382 B2 | 12/2005 | Hirano et al. |
| 6,999,257 B2 | 2/2006 | Takeo |
| 6,999,264 B2 | 2/2006 | Ehrlich |
| 6,999,404 B2 | 2/2006 | Furumiya et al. |
| 7,002,767 B2 | 2/2006 | Annampedu et al. |
| 7,016,131 B2 | 3/2006 | Liu et al. |
| 7,038,875 B2 | 5/2006 | Lou et al. |
| 7,054,088 B2 | 5/2006 | Yamazaki et al. |
| 7,072,137 B2 | 7/2006 | Chiba |
| 7,082,005 B2 | 7/2006 | Annampedu et al. |
| 7,092,462 B2 | 8/2006 | Annampedu et al. |
| 7,116,504 B1 | 10/2006 | Oberg |
| 7,126,776 B1 | 10/2006 | Warren, Jr. et al. |
| 7,133,227 B2 | 11/2006 | Chiang |
| 7,136,250 B1 | 11/2006 | Wu et al. |
| 7,154,689 B1 | 12/2006 | Shepherd et al. |
| 7,158,464 B2 | 1/2007 | Gushima et al. |
| 7,167,328 B2 | 1/2007 | Annampedu et al. |
| 7,180,693 B2 | 2/2007 | Annampedu et al. |
| 7,187,739 B2 | 3/2007 | Ma |
| 7,191,382 B2 | 3/2007 | James et al. |
| 7,193,544 B1 | 3/2007 | Fitelson et al. |
| 7,193,798 B2 | 3/2007 | Byrd et al. |
| 7,199,961 B1 | 4/2007 | Wu et al. |
| 7,203,013 B1 | 4/2007 | Han et al. |
| 7,203,015 B2 | 4/2007 | Sakai et al. |
| 7,206,146 B2 | 4/2007 | Flynn et al. |
| 7,230,789 B1 | 6/2007 | Brunnett et al. |
| 7,248,425 B2 | 7/2007 | Byun et al. |
| 7,253,984 B1 | 8/2007 | Patapoutian et al. |
| 7,265,937 B1 | 9/2007 | Erden et al. |
| 7,286,313 B2 | 10/2007 | Erden et al. |
| 7,301,717 B1 | 11/2007 | Lee et al. |
| 7,308,057 B1 | 12/2007 | Patapoutian |
| 7,323,916 B1 | 1/2008 | Sidiropoulos et al. |
| 7,362,536 B1 | 4/2008 | Liu et al. |
| 7,375,918 B1 | 5/2008 | Shepherd et al. |
| 7,394,608 B2 | 7/2008 | Eleftheriou |
| 7,411,531 B2 | 8/2008 | Aziz et al. |
| 7,420,498 B2 | 9/2008 | Barrenscheen |
| 7,423,827 B2 | 9/2008 | Neville |
| 7,446,690 B2 | 11/2008 | Kao |
| 7,525,460 B1 | 4/2009 | Liu et al. |
| 7,529,320 B2 | 5/2009 | Byrne et al. |
| 7,558,177 B2 | 7/2009 | Ogura et al. |
| 7,602,567 B2 | 10/2009 | Park |
| 7,602,568 B1 | 10/2009 | Katchmart |
| 7,616,395 B2 | 11/2009 | Yamamoto |
| 7,620,101 B1 | 11/2009 | Jenkins |
| 7,630,155 B2 | 12/2009 | Maruyama et al. |
| 7,643,235 B2 | 1/2010 | Erden et al. |
| 7,656,982 B2 | 2/2010 | Gaedke |
| 7,663,831 B2 | 2/2010 | Hayashi et al. |
| 7,679,850 B2 | 3/2010 | Smith |
| 7,693,243 B2 | 4/2010 | Chen et al. |
| 7,738,200 B2 | 6/2010 | Annampedu |
| 7,768,437 B2 | 8/2010 | Annampedu |
| 7,768,730 B2 | 8/2010 | Bliss et al. |
| 7,796,480 B2 | 9/2010 | Cheng et al. |
| 7,813,065 B2 | 10/2010 | Annampedu |
| 7,821,730 B2 | 10/2010 | Cao |
| 7,835,104 B2 | 11/2010 | Yamashita |
| 7,889,823 B2 | 2/2011 | Yang |
| 7,929,237 B2 | 4/2011 | Grundvig |
| 7,929,238 B1 | 4/2011 | Vasquez |
| 8,014,099 B2 | 9/2011 | Mathew |
| 8,054,573 B2 | 11/2011 | Mathew |
| 8,054,931 B2 | 11/2011 | Annampedu |
| 8,059,349 B2 | 11/2011 | Annampedu |
| 8,098,451 B2 | 1/2012 | Graef |
| 8,102,960 B2 | 1/2012 | Ran et al. |
| 8,107,573 B2 | 1/2012 | Chang |
| 8,154,818 B2 | 4/2012 | Mathew |
| 8,154,972 B2 | 4/2012 | Ratnakar Aravind |
| 8,169,726 B2 | 5/2012 | Wilson |
| 8,174,784 B2 | 5/2012 | Grundvig |
| 8,174,949 B2 | 5/2012 | Ratnakar Aravind |
| 8,237,597 B2 | 8/2012 | Liu |
| 8,243,381 B2 | 8/2012 | Annampedu |
| 8,254,049 B2 | 8/2012 | Annampedu |
| 8,261,171 B2 | 9/2012 | Annampedu |
| 2002/0150179 A1 | 10/2002 | Leis et al. |
| 2005/0243455 A1 | 11/2005 | Annampedu |
| 2007/0104300 A1 | 5/2007 | Esumi et al. |
| 2008/0056403 A1 | 3/2008 | Wilson |
| 2009/0142620 A1 | 6/2009 | Yamamoto et al. |
| 2009/0274247 A1 | 11/2009 | Galbraith et al. |
| 2010/0061490 A1 | 3/2010 | Noeldner |
| 2010/0067628 A1 | 3/2010 | Buehner |
| 2010/0142078 A1 | 6/2010 | Annampedu |
| 2011/0043938 A1 | 2/2011 | Mathew |
| 2011/0157737 A1 | 6/2011 | Grundvig et al. |
| 2011/0209026 A1 | 8/2011 | Xia |
| 2012/0036173 A1 | 2/2012 | Annampedu |
| 2012/0084336 A1 | 4/2012 | Yang |
| 2012/0087035 A1 | 4/2012 | Graef |
| 2012/0106607 A1 | 5/2012 | Miladinovic et al. |
| 2012/0120784 A1 | 5/2012 | Yang |
| 2012/0124241 A1 | 5/2012 | Yang et al. |
| 2012/0134042 A1 | 5/2012 | Annampedu |
| 2012/0134043 A1 | 5/2012 | Annampedu |
| 2012/0155587 A1 | 6/2012 | Annampedu |
| 2012/0182643 A1 | 7/2012 | Zhang |
| 2012/0236428 A1 | 9/2012 | Xia |

OTHER PUBLICATIONS

Aziz et al., "Asynchronous Maximum Likelihood (ML) Detection of Servo Repeatable Run Out (RRO) Data", Digest, IEEE Intl Mag Conf, vol. 42, No. 10, pp. 2585-2587 (Oct. 2006).

Aziz et al., Interpolation Based Maximum-Likelihood(ML) Detection of Asynchronous Servo Repeatable Run Out (RRO) Data IEEE Intl Mag Conf. vol. 42 No. 10 pp. 2585-2587, Oct. 2006.

Hagenauer et al., "A Viterbi algorithm with soft-decision outputs and its applications," in Proc. IEEE Global Telecom Conf 1989, Dallas, Texas, pp. 1680-1686 (Nov. 1989).

Kryder, M. et al "Heat Assisted Magnetic Recording" Proc. IEEE, vol. 96, No. 11, p. 1810, Nov. 2008.

Polikar, Robi "Ensemble Based Systems in Decision Making" IEEE Circuits and Systems Magazine Third qtr 2006, p. 21-47.

(56) References Cited

OTHER PUBLICATIONS

U.S. Appl. No. 13/242,983, Unpublished, filed Sep. 23, 2011, Jeffrey P. Grundvig.

U.S. Appl. No. 13/186,267, Unpublished, filed Jul. 19, 2011, Haitao Xia.

U.S. Appl. No. 13/173,088, Unpublished, filed Jun. 30, 2011, Jeffrey P. Grundvig.

U.S. Appl. No. 13/096,873, Unpublished, filed Apr. 28, 2011, Ross S. Wilson.

U.S. Appl. No. 13/100,021, Unpublished, filed May 3, 2011 (Haitao Xia).

Weller et al "Thermal Limits in Ultrahigh-density Magnetic Recording" IEEE Trans. Magn. vol. 35, No. 6, p. 4423, Nov. 1999.

MULTI-ZONE SERVO PROCESSOR

BACKGROUND

In a typical magnetic storage system, digital data is stored in a series of concentric circles or spiral tracks along a storage medium. Data is written to the medium by positioning a read/write head assembly over the medium at a selected location as the storage medium is rotated, and subsequently passing a modulated electric current through the head assembly such that a corresponding magnetic flux pattern is induced in the storage medium. To retrieve the stored data, the head assembly is positioned anew over the track as the storage medium is rotated. In this position, the previously stored magnetic flux pattern induces a current in the head assembly that can be converted to the previously recorded digital data.

A servo control system is used to move the read/write head assembly across the storage medium as the medium is rotated, and may also control the rotation speed and the frequency at which servo data is read. The read/write head assembly must be positioned correctly by the servo control system to properly read stored data. Patterns stored in servo regions or servo wedges on the storage medium enable the servo control system to position the read/write head assembly.

Servo wedges may be divided into multiple zones from the inner diameter to the outer diameter of the storage medium in order to improve efficiency. In contrast to a single-zone servo system, which has a constant servo speed but varying channel bit density from inner diameter to outer diameter, a zoned servo system has similar channel bit density but varying servo speed across zones.

However, when the read/write head assembly moves across a zone boundary and cannot locate the patterns in the servo wedges, it is difficult to determine whether this is due to poor signal quality or incorrect servo speed settings.

BRIEF SUMMARY

The present inventions are related to systems and methods for transferring information to and from a storage medium, and more particularly to systems and methods for positioning a sensor in relation to a storage medium. The multi-zone servo processor disclosed herein provides concurrent detection of the signal frequency in a zoned servo system and processing of servo data fields such as a servo address mark (SAM). Parallel detection channels are created to process servo data retrieved from a zone in a servo wedge on the storage medium, with one detection channel for each candidate zone frequency, and servo preamble detection is performed on each of the detection channels. The channel in which the servo preamble is successfully detected is identified as the winning channel, with the candidate zone frequency associated with the winning channel being the correct servo synthesizer setting for the servo wedge zone. By establishing parallel detection channels to process data at each possible candidate zone frequency, servo zone data such as a servo address mark can be processed while the frequency of the servo zone is being detected, without having to first adjust the servo synthesizer frequency setting to the frequency of the servo zone. Thus, rather than having to detect the zone frequency in a first servo wedge, adjust the servo synthesizer frequency to the detected zone frequency and then wait for the next servo wedge to process servo data, the frequency detection and data processing can be performed concurrently in a single servo wedge. Once the servo zone frequency is detected, the servo synthesizer frequency setting can be adjusted to the detected frequency to improve processing of subsequent servo wedges, but servo data can be obtained from the first servo wedge in which frequency is detected.

In some embodiments of the present inventions, the servo synthesizer is initially set at the frequency of one of the servo wedge zones on the storage medium, and interpolators are used to reconstruct servo preamble data samples in the detection channels where the candidate zone frequency is different from the synthesizer setting. Thus, detection channels perform preamble detection on the servo data read from a servo wedge in each possible candidate zone frequency, and preamble detection will succeed in the detection channel with the frequency matching the actual servo zone being read.

In some embodiments of the present inventions, the servo synthesizer is initially set at an integer multiple of all of the candidate zone frequencies, oversampling the data from a servo wedge. The oversampled data stream is then decimated to provide a data stream at each candidate zone frequency for the parallel detection channels, and preamble detection is attempted in each of the detection channels. Again, preamble detection will succeed in the detection channel with the frequency matching the actual servo zone being read. In both the interpolator-based embodiments and the oversampling embodiments, servo data processing can be performed on the winning channel, including for example servo address mark detection.

In some embodiments, the detection channels are operated in parallel, one per candidate zone frequency. In other embodiments, hardware may be shared by performing some or all of the preamble detection processes serially in shared detection channels.

This summary provides only a general outline of some embodiments according to the present invention. Many other objects, features, advantages and other embodiments of the present invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Figure 1:
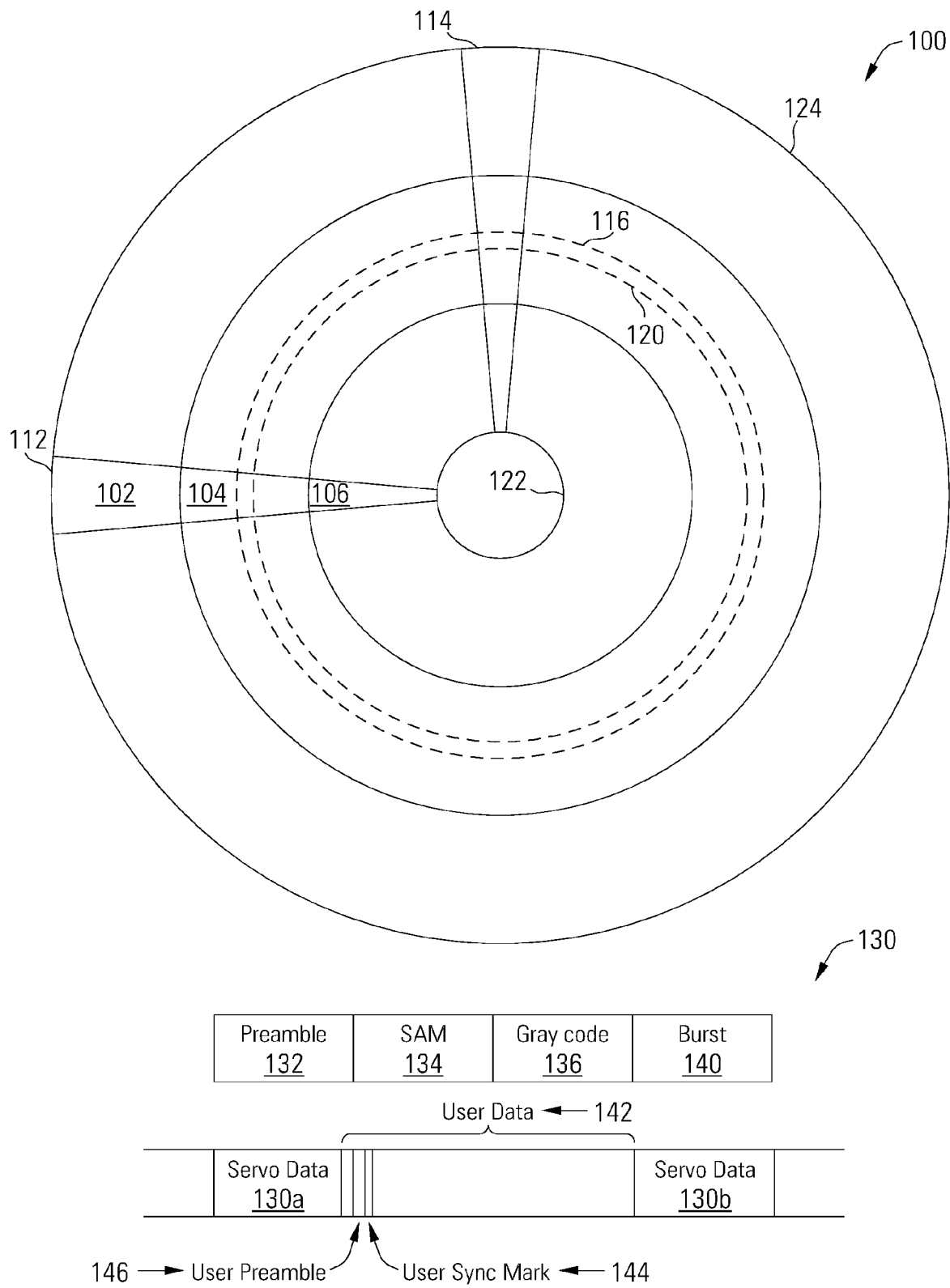
FIG. 1 depicts a diagram of a magnetic storage medium and sector data scheme with zoned servo wedges in accordance with one or more embodiments of the present inventions.

The present inventions are related to systems and methods for transferring information to and from a storage medium, and more particularly to systems and methods for positioning a sensor in relation to a storage medium. The multi-zone servo processor disclosed herein provides concurrent detection of the signal frequency in a zoned servo system and processing of servo data fields such as a servo address mark (SAM). Parallel detection channels are created to process servo data retrieved from a zone in a servo wedge on the storage medium, with one detection channel for each candidate zone frequency, and servo preamble detection is performed on each of the detection channels. The channel in which the servo preamble is successfully detected is identified as the winning channel, with the candidate zone frequency associated with the winning channel being the correct servo synthesizer setting for the servo wedge zone. By establishing parallel detection channels to process data at each possible candidate zone frequency, servo zone data such as a servo address mark can be processed while the frequency of the servo zone is being detected, without having to first adjust the servo synthesizer frequency setting to the frequency of the servo zone. Thus, rather than having to detect the zone frequency in a first servo wedge, adjust the servo synthesizer frequency to the detected zone frequency and then wait for the next servo wedge to process servo data, the frequency detection and data processing can be performed concurrently in a single servo wedge. Once the servo zone frequency is detected, the servo synthesizer frequency setting can be adjusted to the detected frequency to improve processing of subsequent servo wedges, but servo data can be obtained from the first servo wedge in which frequency is detected.

In some embodiments of the present inventions, the servo synthesizer is initially set at the frequency of one of the servo wedge zones on the storage medium, and interpolators are used to reconstruct servo preamble data samples in the detection channels where the candidate zone frequency is different from the synthesizer setting. Thus, detection channels perform preamble detection on the servo data read from a servo wedge in each possible candidate zone frequency, and preamble detection will succeed in the detection channel with the frequency matching the actual servo zone being read.

In some embodiments of the present inventions, the servo synthesizer is initially set at an integer multiple of all of the candidate zone frequencies, oversampling the data from a servo wedge. The oversampled data stream is then decimated to provide a data stream at each candidate zone frequency for the parallel detection channels, and preamble detection is attempted in each of the detection channels. Again, preamble detection will succeed in the detection channel with the frequency matching the actual servo zone being read. In both the interpolator-based embodiments and the oversampling embodiments, servo data processing can be performed on the winning channel, including for example servo address mark detection. The additional servo data processing provides protection against false frequency detection.

In some embodiments, the detection channels are operated in parallel, one per candidate zone frequency. In other embodiments, hardware may be shared by performing some or all of the preamble detection processes serially in shared detection channels.

Zone frequency detection in the multi-zone servo processor can be used during zone switches to provide feedback to the servo controller firmware about the read head location, making it possible to correct the servo channel setting if it was set to wrong frequency, or to move the head if the head is in the wrong zone.

Zoning is an effective method to improve the area density of hard disk drives. In a zoned disk, each zone has its own frequency, which is designed to make area density similar across zones. When servo wedges are zoned, it is important to have robust zone-switching performance. Ideally, the system would have perfect knowledge of the frequency in the target servo zone, and would configure the read channel hardware properly before switching to the new servo zone. However, in practice, errors may occur that either drive the read head to the wrong servo zone, or that configure the read channel for a wrong frequency, either of which could result in failure to find the servo sync address mark (SAM) and detect the track ID in the new servo zone. It is difficult for the servo controller to correct this kind of error without feedback from the read channel, because it may not be evident whether the failure is due to poor signal quality, or due to mismatch between the read channel frequency setting and the actual servo zone frequency. The multi-zone servo processor concurrently detects the actual frequency in the new servo zone from a pool of known candidate frequencies and processes servo data fields, enabling corrections to the position of the read/write head if needed.

Turning to FIG. 1, a magnetic storage medium 100 with multiple servo zones (e.g., 102, 104, 106) in servo wedges (e.g., 112, 114) is depicted in accordance with one or more embodiments of the present inventions. The servo wedges 112, 114 may have any number of servo zones. Two exemplary tracks 116, 120 are shown, indicated as dashed lines. The tracks 116, 120 are segregated by servo data written within wedges 112, 114.

The servo wedges 112, 114 may extend from an inner diameter 122 to an outer diameter 124, each with a single wedge shape, and with the width increasing all the way from inner diameter 122 to outer diameter 124, or the shape of each wedge may be adjusted to avoid becoming extremely wide at outer diameter 124. Servo wedges 112, 114 may have any suitable shape and arrangement, and any number of servo wedges may be provided on storage medium 100. It should be noted that while two tracks 116, 120 and two servo wedges 112, 114 are shown, hundreds of each would typically be included on a given storage medium.

The servo wedges 112, 114 include servo data 130 that are used for control and synchronization of a read/write head assembly over a desired location on storage medium 100. In particular, the servo data 130 generally includes a preamble pattern 132 followed by a servo address mark 134 (SAM). Servo address mark 134 is followed by a Gray code 136, and Gray code 136 is followed by burst information 140. It should be noted that a servo data set may have two or more fields of burst information. Further, it should be noted that different information may be included in the servo fields such as, for example, repeatable run-out information that may appear after burst information 140.

Between the servo data bit patterns 130a and 130b, a user data region 142 is provided. User data region 142 may include one or more sets of data that are stored to storage medium 100.

The data sets may include user synchronization information some of which may be used as a mark to establish a point of reference from which processing of the data within user data region 142 may begin processing.

In operation, storage medium 100 is rotated in relation to a sensor that senses information from the storage medium. In a read operation, the sensor would sense servo data from wedge 112 (i.e., during a servo data period) followed by user data from a user data region between wedge 112 and wedge 114 (i.e., during a user data period) and then servo data from wedge 114. In a write operation, the sensor would sense servo data from wedge 112 then write data to the user data region between wedge 112 and wedge 114, with location information in the user data region provided by a user sync mark 144 and a user preamble 146.

As used herein, the phrase "sync mark" is used in its broadest sense to mean any pattern that may be used to establish a point of reference. Thus, for example, a sync mark may be a user sync mark 144 as is known in the art, or one or more portions of servo data bit patterns 130. Based upon the disclosure provided herein, one of ordinary skill in the art may recognize other sync marks that could be used in relation to different embodiments of the present invention.

Figure 2:
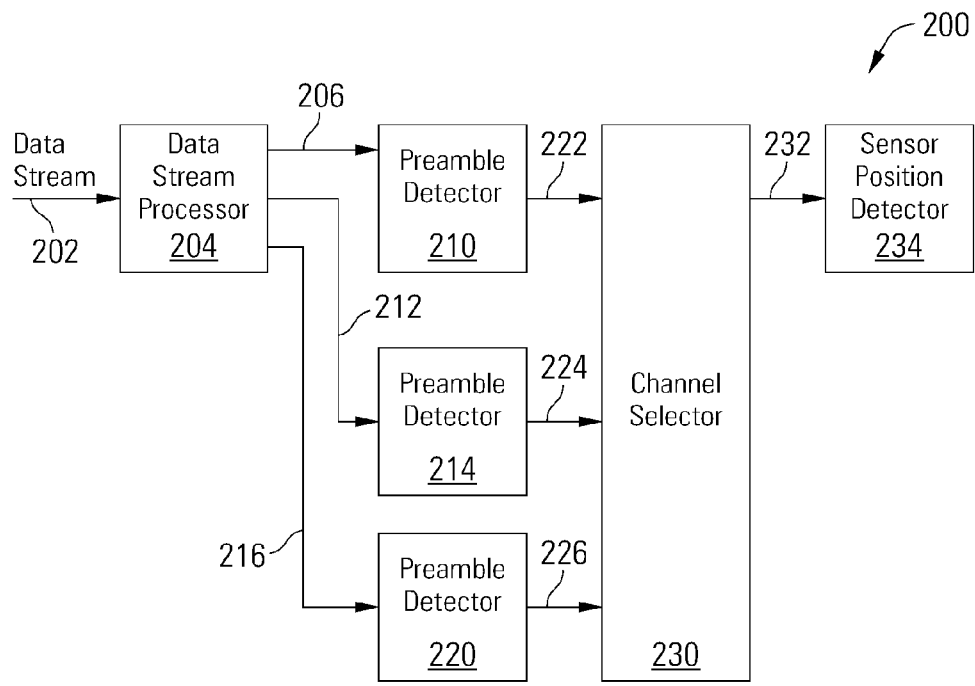
FIG. 2 is a block diagram of a multi-zone servo processor with automatic servo frequency and data detection in accordance with one or more embodiments of the present inventions.

Turning to FIG. 2, a multi-zone servo processor 200 with automatic servo frequency detection and data detection is depicted in accordance with one or more embodiments of the present inventions. A digital data stream 202 is obtained having data samples at an input frequency, which may be a candidate zone frequency of a zoned servo wedge on a storage device, or which may be an integer multiple of all candidate servo zone frequencies on the storage device. In some embodiments, the term "frequency of the data stream 202" refers to the servo synthesizer frequency setting used to obtain the data stream 202 from the storage device.

A data stream processor 204 receives the data stream 202 and generates a number of digital output data streams 206, 212, 216, one for each of the candidate servo zone frequencies on the storage device and each at a different frequency. Again, the term "frequency" when used with respect to the output data streams 206, 212, 216 refers to the native frequency of their corresponding servo zone, or in other words the servo synthesizer frequency setting used to access data in their corresponding servo zone on the storage device.

The multi-zone servo processor is operable in some embodiments to perform preamble detection and to process other servo data fields on baud rate data streams which have one sample per channel bit interval T. In these embodiments, the output data streams 206, 212, 216 are baud rate data streams for each candidate servo frequency. In some other embodiments, the multi-zone servo processor may be operable to process servo data that is oversampled, for example 2× oversampled, in which case the data stream processor 204 generates output data streams 206, 212, 216 that are all twice baud rate for the native frequency of their corresponding servo zone.

In some embodiments, the data stream processor 204 may use decimation on a data stream 202 that has been oversampled at an integer multiple of all candidate servo zone frequencies to generate each output data stream 206, 212, 216. In some other embodiments, the data stream processor 204 may use interpolation to generate each output data stream 206, 212, 216. In the interpolation-based embodiments, the data stream 202 may be obtained at a candidate servo zone frequency, in which case one of the output data streams 206, 212 or 216 will correspond directly with the data stream 202. In other instances, the data stream 202 may be obtained at a different frequency, with all of the output data streams 206, 212, 216 generated using interpolation to correspond to a different candidate servo zone frequency. Any suitable circuits may be used to decimate or interpolate the data stream 202 to generate the output data streams 206, 212, 216. Based upon the disclosure provided herein, one of ordinary skill in the art will recognize a variety of circuitry that may be used to generate the output data streams 206, 212, 216 at the candidate servo zone frequencies based on the data stream 202.

A preamble detector 210, 214, 220 is provided for each parallel detection channel in the multi-zone servo processor 200, each processing one of the data streams 206, 212, 216 to detect the servo preamble (e.g., 132). Preamble detection may be performed in any suitable manner in the preamble detectors 210, 214, 220. An example of a preamble detector is disclosed in U.S. patent application Ser. No. 12/917,756 entitled "Systems and Methods for Variable Thresholding in a Pattern Detector", and filed Nov. 2, 2010 by Nenad Miladinovic. The entirety of the aforementioned application is incorporated herein by reference for all purposes. Based upon the disclosure provided herein, one of ordinary skill in the art will recognize a variety of preamble detection circuits that may be utilized in accordance with different embodiments of the present inventions.

The preamble detectors 210, 214, 220 yield as output 222, 224, 226, respectively, an indicate of whether the preamble was detected in the corresponding data stream 206, 212, 216 at the input of each preamble detector 210, 214, 220. A channel selector 230 receives the preamble detector outputs 222, 224, 226 and selects the winning data stream 206, 212, 216 in which the preamble was detected. The data stream s 206, 212, 216 may be included in the preamble detector outputs 222, 224, 226 for use by the channel selector 230, or the channel selector 230 may receive the data stream s 206, 212, 216 from the data stream processor 204.

The channel selector 230 is operable to yield as output 232 a winning data stream 206, 212, 216, if any, for further processing of servo data fields. The winning data stream at output 232 is the data stream at the frequency of the source servo wedge zone. The winning data stream is identified as the data stream 206, 212, 216 in which the preamble was successfully detected in a preamble detector 210, 214, or 220. If the preamble is detected in more than one data stream 206, 212, 216, the detection is deemed to be erroneous and the channel selector 230 outputs no data stream. Similarly, if the preamble is not detected in any data stream 206, 212, 216, the channel selector 230 outputs no data stream.

The channel selector 230 may comprise any circuitry suitable to perform the comparisons and data stream selection disclosed above, such as logic blocks or state machines to identify the winning data stream in which the preamble was detected and to determine that the preamble was detected in one and only one data stream, and a multiplexer to select as output 232 the winning data stream. Based upon the disclosure provided herein, one of ordinary skill in the art will recognize a variety of circuitry that may be used to detect and output the winning data stream.

The channel selector output 232 is provided to a sensor position detector 234, a circuit or collection of circuits or firmware that performs any desired further processing on the servo data, for example including servo address mark detection, decoding of Gray codes and RRO data fields, demodulation of burst data, etc., to identify the location of the data sensor such as a read/write head assembly in a magnetic hard disk drive. The channel selector output 232 may also include an indication of the winning data stream frequency, which may be used to configure the servo synthesizer frequency before processing a subsequent servo wedge.

Figure 3:
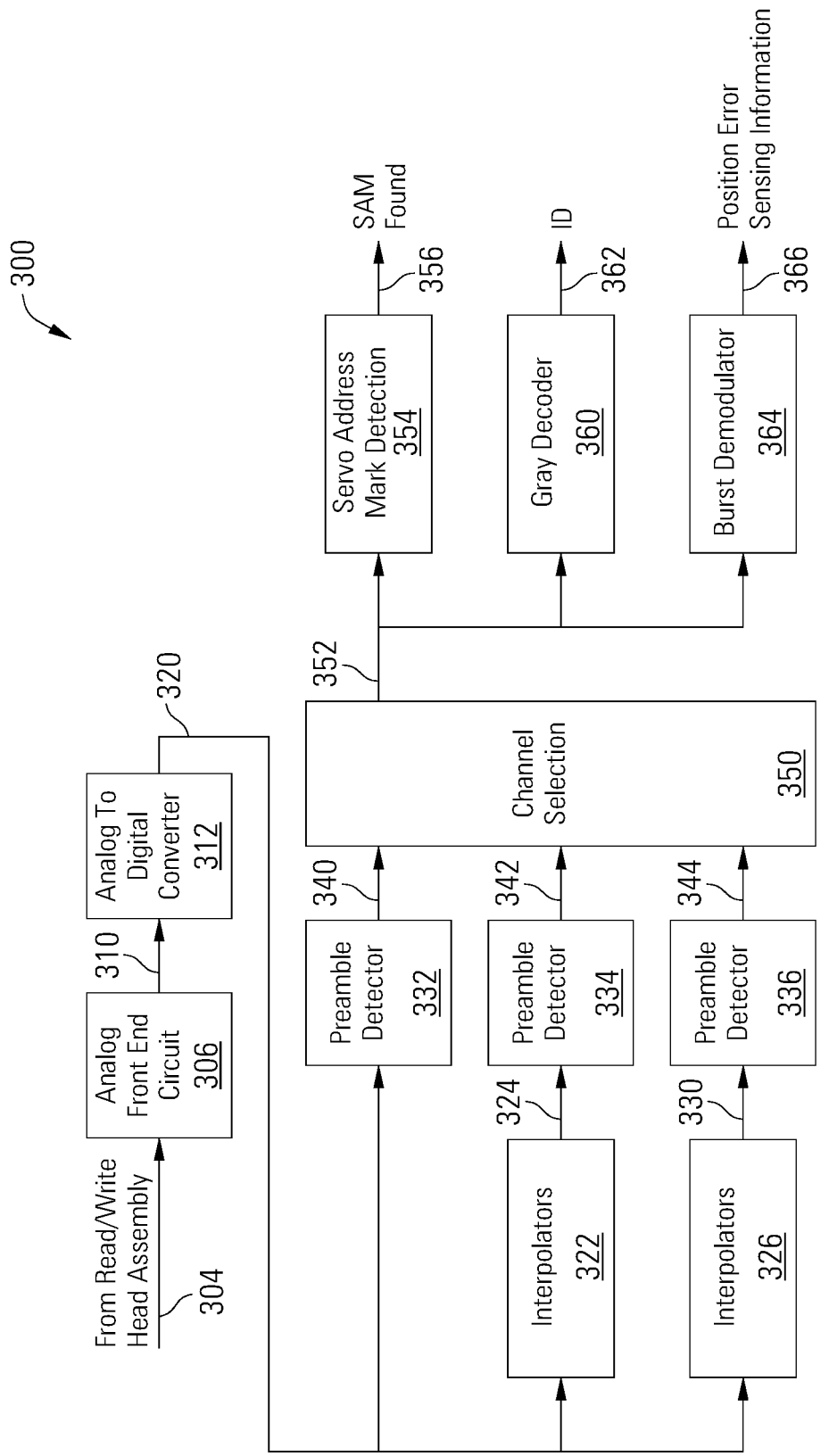
FIG. 3 is a block diagram of a multi-zone servo processor with interpolation-based servo frequency and data detection in accordance with one or more embodiments of the present inventions.

Turning to FIG. 3, a multi-zone servo processor 300 is depicted which includes interpolation-based servo frequency and data detection in accordance with one or more embodiments of the present inventions. Such a multi-zone servo processor 300 may be included, for example, in a read channel or a hard disk controller for a magnetic hard drive to detect servo preambles, servo address marks, etc. to position a read/write head assembly. The multi-zone servo processor 300 includes an analog front end circuit 306 that receives and processes an analog signal 304 from the read/write head assembly. Analog front end 306 may include, but is not limited to, an analog filter and an amplifier circuit as are known in the art. For example, the analog front end 306 may include an AC coupler (ACC) or high pass filter, a variable gain amplifier (VGA), a compensation circuit for the magneto-resistive asymmetry (MRA) characteristic of a magnetic write head, etc. Based upon the disclosure provided herein, one of ordinary skill in the art will recognize a variety of circuitry that may be included as part of analog front end circuit 306. In some cases, the gain of a variable gain amplifier included as part of analog front circuit 306 may be modifiable, and the cutoff frequency and boost of an analog filter included in analog front end circuit 306 may be modifiable. Analog front end circuit 306 receives and processes the analog signal 304, and provides a processed analog signal 310 to an analog to digital converter circuit 312.

Analog to digital converter circuit 312 converts processed analog signal 310 into a corresponding series of digital samples 320. Analog to digital converter circuit 312 may be any circuit known in the art that is capable of producing digital samples corresponding to an analog input signal 304. Based upon the disclosure provided herein, one of ordinary skill in the art will recognize a variety of analog to digital converter circuits that may be used in relation to different embodiments of the present inventions.

The digital samples 320 are provided to each of a number of parallel preamble detection channels 302, one channel per servo zone frequency. In some embodiments, a separate preamble detector 332, 334, 336 is provided in each of the preamble detection channels, enabling fully parallel processing of each channel. In other embodiments, the processing may be performed either partly or wholly in serial fashion, sharing hardware resources as processing time permits.

In the example illustrated in FIG. 3, the digital samples 320 are at a candidate servo frequency, and interpolators 322, 326 are used to generate interpolated digital samples 324, 330, respectively, at the other candidate servo frequencies. Thus, regardless of which servo frequency at which the digital samples 314 are generated, one of the channels of digital samples 320, 324 or 330 will correspond to the actual frequency of the servo wedge zone from which the data was retrieved. The interpolators 322, 326 are configured to provide digital samples at the candidate frequencies other than that of the filtered digital samples 320. Because the digital samples 320 may be at any candidate frequency depending on the servo synthesizer frequency setting, each of the interpolators 322, 326 may be programmable to provide the needed interpolation points to provide digital samples at every candidate frequency. In other embodiments, the digital samples 320 may be at a frequency other than a candidate servo frequency, with interpolators provided for each preamble detection channel.

Interpolators 322, 326 may be any circuit known in the art that is capable of producing digital data based on input data, sampled at different points than the input data. Based upon the disclosure provided herein, one of ordinary skill in the art will recognize a variety of interpolation circuits that may be used in relation to different embodiments of the present inventions. In order to support arbitrary frequency ratios between zones, the interpolators 322, 326 calculate the interpolation points and the interpolation coefficients. In the example presented below, the storage device is divided into three zones with candidate servo frequencies of 400 MHz, 500 MHz, and 600 MHz with frequency ratios of 4:5:6. The interpolation points may be calculated according to Equation 1:

$$Ts(n) = \frac{F_{now}}{F_{zone}} * n * T \qquad (Eq\ 1)$$

where $F_{now}$ is the servo synthesizer frequency, which can be one of the three example candidate frequencies, $F_{zone}$ is the candidate frequency for which the interpolation point is to be calculated, n is the sample index, which ranges from 0 to the length of the servo event, and T is the sampling interval using the synthesizer setting of $F_{now}$.

The interpolation points for each servo synthesizer setting in this example are set forth in Table 1 below, in which the row headings give the actual servo synthesizer frequency settings $F_{now}$ and the column headings give the candidate frequencies $F_{zone}$ of each servo zone:

TABLE 1

| | $F_{zone}$ | | |
|---|---|---|---|
| $F_{now}$ | 400 MHz | 500 MHz | 600 MHz |
| 400 MHz | — | $\left[0, \frac{4}{5}T, \frac{8}{5}T, \frac{12}{5}T\right]$ | $\left[0, \frac{2}{3}T, \frac{4}{3}T, 2T\right]$ |
| 500 MHz | $\left[0, \frac{5}{4}T, \frac{5}{2}T, \frac{15}{4}T, 5T\right]$ | — | $\left[0, \frac{5}{6}T, \frac{5}{3}T, \frac{5}{2}T, \frac{10}{3}T\right]$ |
| 600 MHz | $\left[0, \frac{3}{2}T, 3T, \frac{9}{2}T, 6T, \frac{15}{2}T\right]$ | $\left[0, \frac{6}{5}T, \frac{12}{5}T, \frac{18}{5}T, \frac{24}{5}T, 6T\right]$ | — |

Again, the interpolation may be performed using any suitable technique. In some example embodiments, the piecewise parabolic functions of Equation 2 are used to generate four interpolator coefficients for interpolation point µ:

$a0 = 0.43*(\mu^2 - \mu)$ $a1 = -0.43*\mu^2 + 1.43*\mu$ $a2 = -0.43*\mu^2 - 0.57*\mu + 1$ $a3 = 0.43*\mu^2 - 0.43*\mu \qquad (Eq\ 2)$ The multi-zone servo processor 300 is not limited to the use of four interpolator points. The interpolation may be performed, for example, according to Equation 3:

$$y(\mu)=a0*y0+a1*y1+a2*y2+a3*y3 \quad (Eq\ 3)$$

where y0, y1, y2, y3 are samples in filtered digital samples 320, sampled at times 0, T, 2T and 3T, respectively. This calculation is performed for each of the interpolation points of Table 1. To reduce latency, multiple interpolators may be implemented in parallel in each interpolator circuit 322, 326. For example, for the 600 MHz synthesizer setting, five interpolators can run in parallel, generating samples at ⅕T resolution. Because the number of interpolated samples in each T interval varies with the candidate frequency, buffers may be included in interpolator circuits 322, 326 so that only one sample is sent to the preamble detector 334,336 in each T.

The digital samples 320 and interpolated digital samples 324,330 are provided to preamble detectors 340, 342, 344 to detect the preamble patterns in the digital samples. The preamble detectors 340, 342, 344 are adapted to detect preamble patterns at about the candidate frequencies but not to detect preamble patterns at neighboring candidate frequencies. The frequency resolution of the preamble detectors 340, 342, 344 may be based on the separation between the candidate frequencies to avoid false detection. The preamble detectors 340, 342, 344 may be the same for each preamble detection channel, assuming the incoming signal is at baud rate, comparing the signal energy at the preamble frequency and other frequencies to detect the preamble or using pattern matching circuits.

The preamble detectors 340, 342, 344 provide as output 340, 342, 344 an indication of whether the preamble was detected in each set of data samples 320, 324, 330. A channel selector 350 selects the data samples 320, 324, 330 in which the preamble was detected and yields as output the winning data stream 352. The winning data stream at output 352 is the data stream at the frequency of the source servo wedge zone. Again, if the preamble is detected in more than one set of data samples 320, 324, 330, the detection is deemed to be erroneous and the channel selector 350 outputs no data stream.

Once a preamble is detected and the channel selector 350 selects the winning channel 352, a SAM detection circuit 354 begins querying digital samples in the winning channel 352 for a known servo address mark pattern. SAM detection circuit 354 is operable to detect a servo address mark and to assert a SAM Found signal 356 upon identifying the servo address mark. This SAM Found signal 356 may be comparable to SAM Found signals that have been used in the existing art to synchronize the processing of subsequent Gray code data and burst information. When the SAM Found signal 356 is asserted, the candidate frequency selected by preamble detection channels 302 and channel selector 350 is confirmed as the actual frequency for the zone being accessed, and the servo synthesizer frequency setting may be changed to the detected frequency when processing a subsequent servo wedge. The servo synthesizer frequency change may be performed by the multi-zone processor 300 at the end of the servo event in which SAM is detected, or a flag may be stored enabling a servo controller to decide whether to change the servo synthesizer frequency setting later.

The multi-zone servo processor 300 may include additional servo data processing circuits, such as a Gray code decoder 360 that decodes the Gray code (e.g., 136) in the winning channel 352 to yield track ID information 362, and a burst demodulator 364 to demodulate the burst information (e.g., 140) in the winning channel 352 to provide position error sensing information 366.

The filter poles in the analog front end circuit 306 and the gain of the analog signal 304 may be optimized to reduce performance loss in SAM/Gray code detection when the servo synthesizer is not set at the native zone frequency, or may be adjusted for the winning frequency after frequency detection in the multi-zone servo processor 300 to improve performance when processing subsequent servo wedges.

Figure 4:
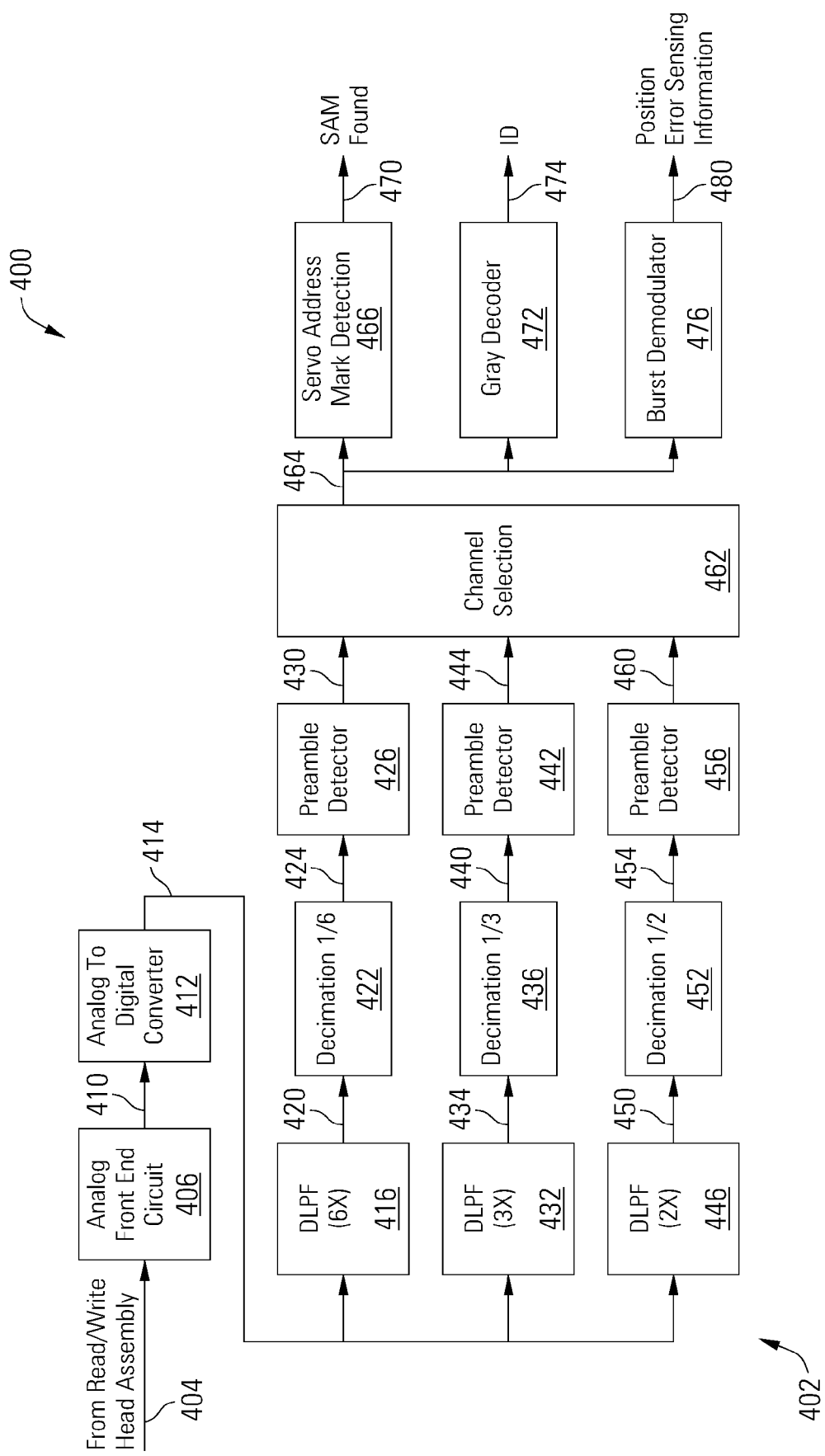
FIG. 4 is a block diagram of a multi-zone servo processor with oversampling-based servo frequency and data detection in accordance with one or more embodiments of the present inventions.

Turning to FIG. 4, a multi-zone servo processor 400 with oversampling-based servo frequency and data detection is depicted in accordance with one or more embodiments of the present inventions. In these embodiments, the servo synthesizer is set at an integer multiple of each of the candidate servo frequencies. For example, with servo zones having candidate frequencies of 200 MHz, 400 MHz, and 600 MHz with frequency ratios of 1:2:3, the servo synthesizer is set at 1200 MHz. Such a multi-zone servo processor 400 may be included, for example, in a read channel or a hard disk controller for a magnetic hard drive to detect servo preambles, servo address marks, etc. to position a read/write head assembly.

The multi-zone servo processor 400 includes an analog front end circuit 406 that receives and processes an analog signal 404 from the read/write head assembly. Analog front end 406 may include, but is not limited to, an analog filter and an amplifier circuit as are known in the art. Analog front end circuit 406 receives and processes the analog signal 404, and provides a processed analog signal 410 to an analog to digital converter circuit 412.

Analog to digital converter circuit 412 converts processed analog signal 410 into a corresponding series of digital samples 414. Digital samples 414 are provided to a number of digital low pass filters 416, 432, 446 in parallel preamble detection channels 402. Each of the digital low pass filters 416, 432, 446 is designed for the corresponding oversampling rate. For example, digital low pass filter 416 is adapted to filter data samples that have been oversampled at a 6× rate, that is, 200 MHz servo data that has been oversampled to 1200 MHz due to the servo synthesizer frequency setting. Digital low pass filter 432 is adapted to filter data samples that have been oversampled at a 3× rate, that is, 400 MHz servo data that has been oversampled to 1200 MHz due to the servo synthesizer frequency setting. Digital low pass filter 446 is adapted to filter data samples that have been oversampled at a 2× rate, that is, 600 MHz servo data that has been oversampled to 1200 MHz due to the servo synthesizer frequency setting. Depending on the actual servo zone frequency, one of the digital low pass filters 416, 432, 446 will be configured correctly for the digital samples 414 and the others will be configured incorrectly. Digital low pass filters 416, 432, 446 may be any circuit known in the art that is capable of filtering digital samples 414 to yield filtered digital samples 420, 434, 450. Based upon the disclosure provided herein, one of ordinary skill in the art will recognize a variety of digital filters that may be used in relation to different embodiments of the present inventions.

The filtered digital samples 420, 434, 450 from digital low pass filters 416, 432, 446 are provided to parallel decimators 422, 436, 452, one per servo zone frequency. The decimators 422, 436, 452 downsample the filtered digital samples 420, 434, 450 to the candidate servo frequencies. Decimator 422 downsamples the filtered digital samples 420 by ⅙, that is, digital samples oversampled at 1200 MHz due to the servo synthesizer frequency setting are downsampled to 200 MHz. Decimator 436 downsamples the filtered digital samples 434 by ⅓, that is, digital samples oversampled at 1200 MHz due to the servo synthesizer frequency setting are downsampled to 400 MHz. Decimator 452 downsamples the filtered digital samples 450 by ½, that is, digital samples oversampled at 1200 MHz due to the servo synthesizer frequency setting are downsampled to 600 MHz. The resulting decimated digital samples 424, 440 and 454 are thus baud rate signals at each of the candidate servo zone frequencies, 200 MHz, 400 MHz, and 600 MHz, respectively. The decimators 422, 436, 452 may be any circuit known in the art that is capable of downsampling filtered digital samples 420, 434, 450. Based upon the disclosure provided herein, one of ordinary skill in the art will recognize a variety of decimation circuits that may be used in relation to different embodiments of the present inventions.

The decimated digital samples 424, 440 and 454 are provided to preamble detectors 426, 442, 456, each of which are operable to detect the preamble patterns in baud rate sample streams at about the candidate frequencies but not to detect preamble patterns at neighboring candidate frequencies. The frequency resolution of the preamble detectors 426, 442, 456 may be based on the separation between the candidate frequencies to avoid false detection. The preamble detectors 426, 442, 456 may be the same for each preamble detection channel, assuming the incoming signals are at baud rate, comparing the signal energy at the preamble frequency and other frequencies to detect the preamble or using pattern matching circuits.

The preamble detectors 426, 442, 456 provide as output 430, 444, 460 an indication of whether the preamble was detected in each set of decimated digital samples 424, 440, 454. A channel selector 462 selects the channel in which the preamble was detected and yields as output the winning data stream 464. The winning data stream 464 is the data stream 424, 440 or 454 at the frequency of the source servo wedge zone. If the preamble is detected in more than one set of data samples 424, 440, 454, the detection is deemed to be erroneous and the channel selector 462 outputs no data stream.

Once a preamble is detected and the channel selector 462 selects the winning channel 464, a SAM detection circuit 466 begins querying digital samples in the winning channel 464 for a known servo address mark pattern. SAM detection circuit 466 is operable to detect a servo address mark and to assert a SAM Found signal 470 upon identifying the servo address mark. This SAM Found signal 470 may be comparable to SAM Found signals that have been used in the existing art to synchronize the processing of subsequent Gray code data and burst information. When the SAM Found signal 470 is asserted, the candidate frequency selected by preamble detection channels 402 and channel selector 462 is confirmed as the actual frequency for the zone being accessed, and the servo synthesizer frequency setting may be changed to the detected frequency when processing a subsequent servo wedge. The servo synthesizer frequency change may be performed immediately by the multi-zone servo processor 400 when the SAM Found signal 470 is asserted, or a flag may be stored enabling a servo controller to decide whether to change the servo synthesizer frequency setting later.

The multi-zone servo processor 400 may include additional servo data processing circuits, such as a Gray code decoder 472 that decodes the Gray code (e.g., 136) in the winning channel 464 to yield track ID information 474, and a burst demodulator 476 to demodulate the burst information (e.g., 140) in the winning channel 464 to provide position error sensing information 480.

The filter poles in the analog front end circuit 406 and the gain of the analog signal 404 may be optimized to reduce performance loss in SAM/Gray code detection when the servo synthesizer is not set at the native zone frequency, or may be adjusted for the winning frequency after frequency detection in the multi-zone servo processor 400 to improve performance when processing subsequent servo wedges.

Figure 5:
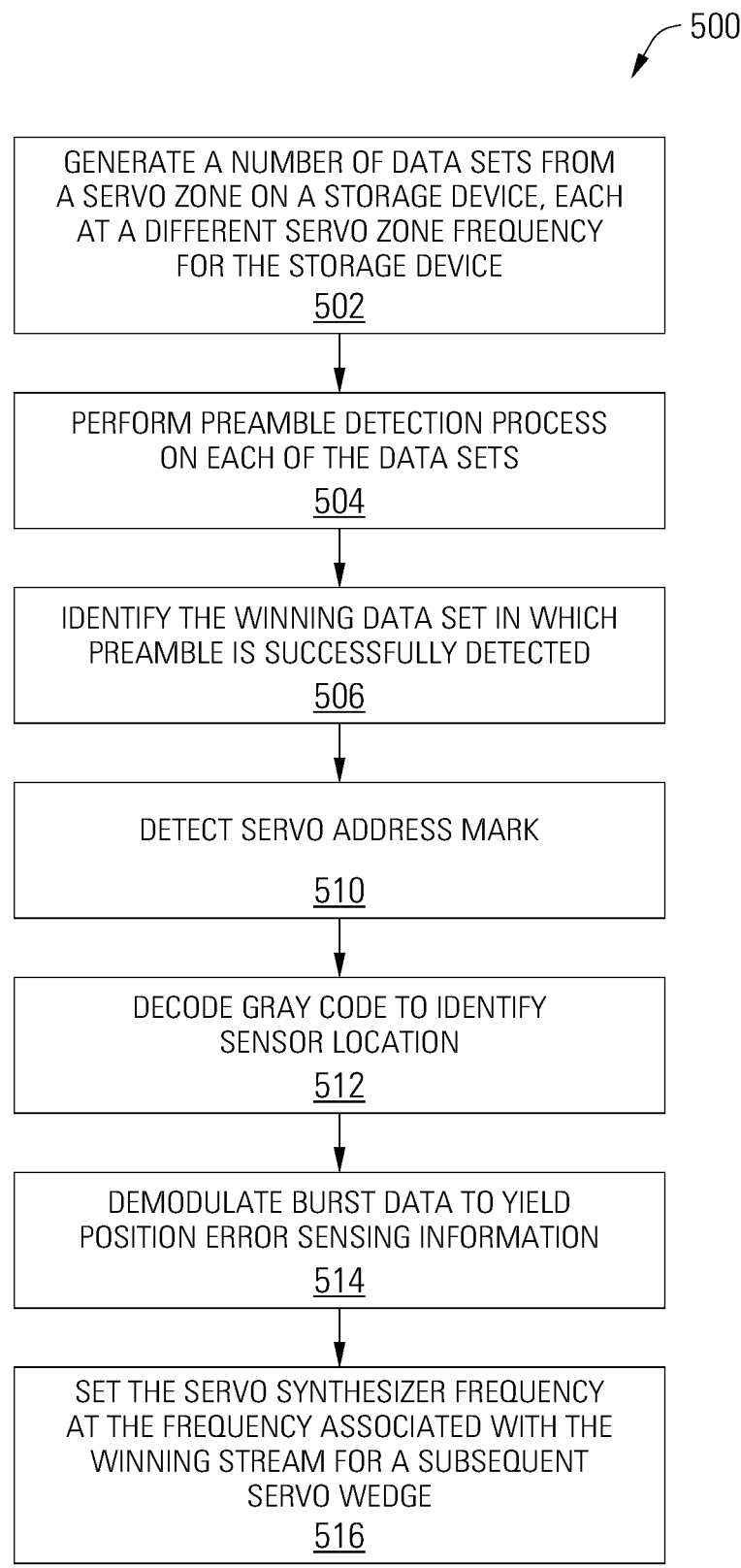
FIG. 5 depicts a flow diagram of an operation for detecting servo zone frequency and data in a multi-zone servo processor in accordance with one or more embodiments of the present inventions.

Turning to FIG. 5, a flow diagram 500 depicts an operation for detecting servo zone frequency and data in a multi-zone servo processor in accordance with one or more embodiments of the present inventions. Following flow diagram 500, a number of data sets are generated from a servo zone on a storage device, each at a different servo zone frequency for the storage device. (Block 502) The data may be derived from, for example, a magnetic storage medium. In some embodiments, the data sets are generated by interpolating the data obtained from a storage device using a servo synthesizer set at one of the candidate zone frequencies to generate a data set at each candidate zone frequency. In some other embodiments, the data sets are generated by filtering and decimating oversampled data obtained from a storage device using a servo synthesizer set at an integer multiple of the candidate zone frequencies to generate a data set at each candidate zone frequency. A preamble detection process is performed on each of the data sets. (Block 504) The winning data set is identified, in which the preamble was successfully detected. (Block 506) If the preamble is detected in multiple data sets, the result may be ignored as a false detection, and the preamble detection process continued on all channels. A servo address mark detection process is performed on the winning data set. (Block 510) Successful detection of the servo address mark in the winning data set can be taken as confirmation that the frequency of the winning data set is the correct servo zone frequency. The Gray code is decoded in the winning data set to identify track ID, giving the sensor position. (Block 512) The burst data in the winning data set is demodulated to yield position error sensing information. (Block 514) The servo synthesizer frequency is set to the frequency of the winning data set for a subsequent servo wedge. (Block 516) The servo synthesizer frequency may be set automatically upon confirmation that the correct zone frequency has been detected, or a flag to the servo controller firmware may indicate that the frequency has been detected, allowing the servo controller firmware to change the servo synthesizer frequency setting later. The operation may be performed with some steps in parallel, and is not limited to the order illustrated in FIG. 5.

Figure 6:
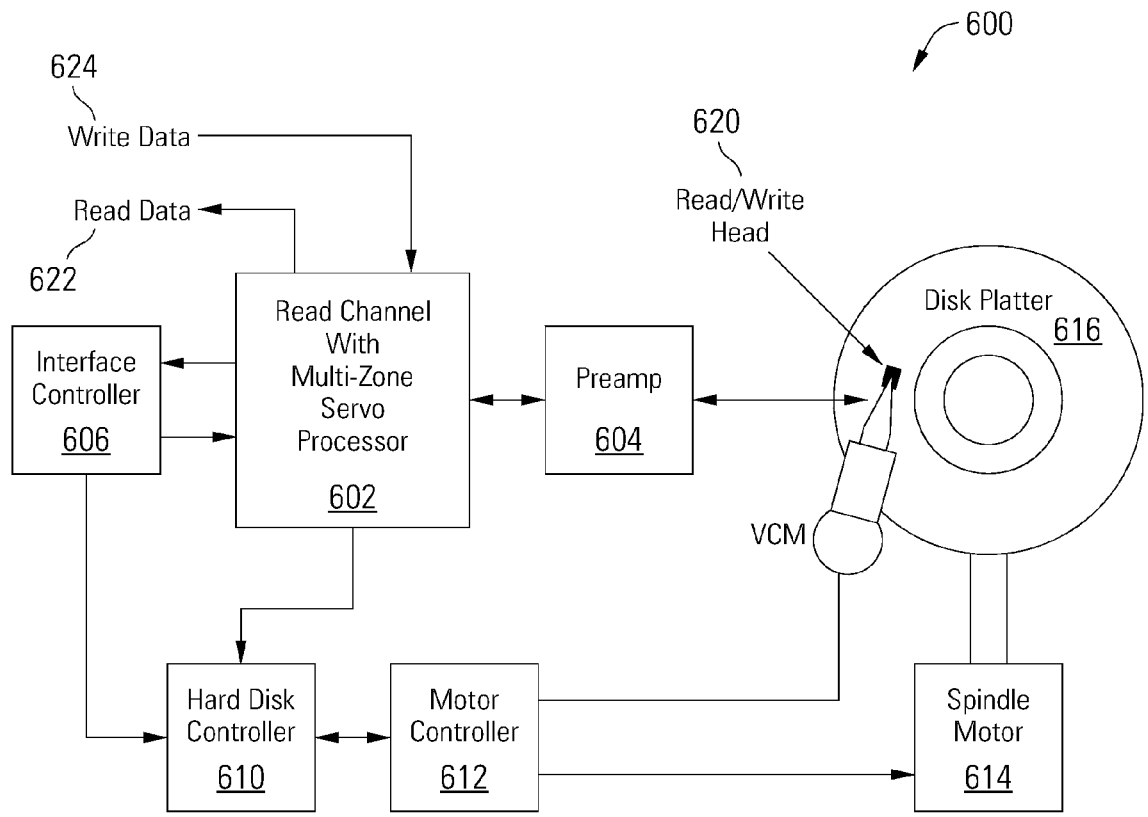
FIG. 6 depicts a storage system with a multi-zone servo processor with automatic servo frequency and data detection in accordance with one or more embodiments of the present inventions.

Turning to FIG. 6, a storage system 600 with multi-servo zone processor is illustrated as an example application. The storage system 600 includes a read channel circuit 602 with multi-servo zone processor. Storage system 600 may be, for example, a hard disk drive. Storage system 600 also includes a preamplifier 604, an interface controller 606, a hard disk controller 610, a motor controller 612, a spindle motor 614, a disk platter 616, and a read/write head assembly 620. In other embodiments, the multi-servo zone processor may be located in interface controller 606, in hard disk controller 610, or elsewhere in the storage system 600. Interface controller 606 controls addressing and timing of data to/from disk platter 616. The data on disk platter 616 consists of groups of magnetic signals that may be detected by read/write head assembly 620 when the assembly is properly positioned over disk platter 616. In one embodiment, disk platter 616 includes magnetic signals recorded in accordance with either a longitudinal or a perpendicular recording scheme.

In a typical read operation, read/write head assembly 620 is accurately positioned by motor controller 612 over a desired data track on disk platter 616. Motor controller 612 both positions read/write head assembly 620 in relation to disk platter 616 and drives spindle motor 614 by moving read/write head assembly 620 to the proper data track on disk platter 616 under the direction of hard disk controller 610.

Spindle motor 614 spins disk platter 616 at a determined spin rate (RPMs). Once read/write head assembly 620 is positioned adjacent the proper data track, magnetic signals representing data on disk platter 616 are sensed by read/write head assembly 620 as disk platter 616 is rotated by spindle motor 614. The sensed magnetic signals are provided as a continuous, minute analog signal representative of the magnetic data on disk platter 616. This minute analog signal is transferred from read/write head assembly 620 to read channel circuit 602 via preamplifier 604. Preamplifier 604 is operable to amplify the minute analog signals accessed from disk platter 616. In turn, read channel circuit 602 decodes and digitizes the received analog signal to recreate the information originally written to disk platter 616. This data is provided as read data 622 to a receiving circuit. A write operation is substantially the opposite of the preceding read operation with write data 624 being provided to read channel circuit 602. This data is then encoded and written to disk platter 616.

It should be noted that storage system 600 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such storage system 700, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

It should be noted that the various blocks discussed in the above application may be implemented in integrated circuits along with other functionality. Such integrated circuits may include all of the functions of a given block, system or circuit, or a portion of the functions of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the present invention provides novel systems, devices, methods and arrangements for servo zone detection using a multi-servo zone processor. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. An apparatus for determining a sensor position comprising:
    a data stream processor operable to generate a plurality of data streams at different frequencies based on an input data stream;
    a plurality of servo preamble detectors each operable to process a different one of the plurality of data streams to detect a servo preamble;
    a selector operable to output one of the plurality of data streams in which the servo preamble was detected as a winning data stream; and
    a pattern detector operable to detect a pattern in the winning data stream.

2. The pattern detector of claim 1, wherein the pattern detector comprises a servo address mark detector.

3. The apparatus of claim 1, wherein the input data stream is obtained from a magnetic storage device with zoned servo wedges, and wherein the different frequencies comprise servo zone frequencies.

4. The apparatus of claim 1, wherein the selector is operable to output the winning data stream only when the servo preamble is detected in a single one of the plurality of data streams.

5. The apparatus of claim 1, wherein the plurality of servo preamble detectors are each operable to detect the servo preamble in an input one of the plurality of data streams when the input one of the plurality of data streams contains baud rate data samples at a native servo synthesizer frequency for a servo wedge zone from which the input data stream was obtained.

6. The apparatus of claim 1, wherein the data stream processor comprises a plurality of interpolators.

7. The apparatus of claim 6, wherein the input data stream is obtained from a storage device at one of a plurality of candidate servo zone frequencies, and wherein the plurality of interpolators interpolate between samples of the input data stream at each of a remainder of the plurality of candidate servo zone frequencies.

8. The apparatus of claim 6, wherein the interpolators are operable to calculate interpolation sample points and interpolation coefficients.

9. The apparatus of claim 1, wherein the different frequencies of the plurality of data streams comprises candidate servo zone frequencies for a magnetic storage device, and wherein the input data stream is obtained from a servo wedge zone on the magnetic storage device using a servo synthesizer frequency set at an integer multiple of the candidate servo zone frequencies.

10. The apparatus of claim 9, wherein the data stream processor comprises a plurality of digital low pass filters each operable to filter the input data stream at a different oversampling rate, where the oversampling rate of each of the plurality of digital low pass filters is determined based on the servo synthesizer frequency and a different one of the candidate servo zone frequencies.

11. The apparatus of claim 10, wherein the data stream processor comprises a plurality of decimators each operable to downsample an output of a different one of the plurality of digital low pass filters to yield the plurality of data streams.

12. The apparatus of claim 11, wherein the plurality of decimators is each operable to downsample at different rate determined based on a different one of the candidate servo zone frequencies divided by the servo synthesizer frequency.

13. The apparatus of claim 1, wherein the data stream processor, the plurality of servo preamble detectors, the selector and the pattern detector are implemented as an integrated circuit.

14. The apparatus of claim 1, wherein the data stream processor, the plurality of servo preamble detectors, the selector and the pattern detector are incorporated in a storage device.

15. The apparatus of claim 14, wherein the storage device comprises a redundant array of independent disks.

16. A method for detecting a servo zone frequency and servo data, comprising:
generating a plurality of data sets from a servo wedge zone on a storage device, each at a different servo zone frequency for the storage device;
performing a servo preamble detection process on each of the data sets;
identifying a winning data set in which a servo preamble is successfully detected; and
setting a servo synthesizer frequency at a frequency associated with the winning stream for a subsequent servo wedge.

17. The method of claim 16, further comprising detecting a servo address mark in the winning data set, wherein the servo synthesizer frequency is set after the servo address mark is detected.

18. The method of claim 16, wherein generating the plurality of data sets comprises obtaining an input data set from the servo wedge zone at one of the servo zone frequencies for the storage device and interpolating the input data set to each of a remainder of the servo zone frequencies for the storage device.

19. The method of claim 16, wherein generating the plurality of data sets comprises obtaining an input data set from the servo wedge zone, wherein the input data set is oversampled at an integer multiple of the servo zone frequencies for the storage device, and decimating the input data set at different sampling rates to yield the plurality of data sets.

20. A storage system comprising:
a storage medium maintaining a data set;
a read/write head assembly operable to sense the data set on the storage medium; and
a multi-zone servo processor operable to determine a location of the read/write head assembly, comprising:
a data stream processor operable to generate a plurality of data streams at different frequencies based on the data set;
a plurality of servo preamble detectors each operable to process a different one of the plurality of data streams to detect a servo preamble;
a selector operable to output one of the plurality of data streams in which the servo preamble was detected as a winning data stream; and
a pattern detector operable to detect a pattern in the winning data stream, wherein the pattern indicates the location of the read/write head assembly.

* * * * *